United States Patent [19]

Cziptschirsch

[11] 4,353,591
[45] Oct. 12, 1982

[54] SUN VISOR FOR VEHICLES

[75] Inventor: Kurt Cziptschirsch, Wuppertal, Fed. Rep. of Germany

[73] Assignee: Gebr. Happich GmbH, Fed. Rep. of Germany

[21] Appl. No.: 129,991

[22] Filed: Mar. 13, 1980

[30] Foreign Application Priority Data

Mar. 17, 1979 [DE] Fed. Rep. of Germany ....... 2910631
Jan. 12, 1980 [DE] Fed. Rep. of Germany ....... 3001062

[51] Int. Cl.³ .................................................. B60J 3/00
[52] U.S. Cl. ................................... 296/97 H; 296/97 R
[58] Field of Search ................. 296/97 R, 97 H, 97 K

[56] References Cited

U.S. PATENT DOCUMENTS

| 3,032,371 | 5/1962 | Berridge et al. | 296/97 K |
| 3,128,121 | 4/1964 | Greig | 296/97 H |
| 3,242,245 | 3/1966 | Greig et al. | 296/97 H |
| 4,163,579 | 8/1979 | Mahler et al. | 296/97 H |

FOREIGN PATENT DOCUMENTS

| 1163176 | 2/1964 | Fed. Rep. of Germany | ... 296/97 H |
| 1430197 | 8/1969 | Fed. Rep. of Germany | . |
| 1906915 | 8/1969 | Fed. Rep. of Germany | ... 296/97 K |
| 1955674 | 6/1970 | Fed. Rep. of Germany | ... 296/97 H |
| 2231309 | 1/1974 | Fed. Rep. of Germany | ... 296/97 H |
| 2524715 | 12/1976 | Fed. Rep. of Germany | . |
| 2913933 | 10/1979 | Fed. Rep. of Germany | ... 296/97 H |
| 40104 | 7/1965 | German Democratic Rep. | ... 296/97 H |

Primary Examiner—Joseph F. Peters, Jr.
Assistant Examiner—Ross Weaver
Attorney, Agent, or Firm—Ostrolenk, Faber, Gerb & Soffen

[57] ABSTRACT

The disclosure concerns a sun visor body or the reinforcing insert for a sun visor body which is comprised of a blow molded body on which corrugations are defined. The body has two opposite sides which are held together. A mount is formed toward one corner of the body. A plurality of depressed corrugations extend across both opposite sides of the body from the mount to various positions away from the mount. The orientations of the coorugations are selected to strengthen the body and particularly to strengthen it against tensile stress. The corrugations terminate short of the edge regions of the body. Furthermore, where corrugations would intersect, the corrugations are interrupted or terminate short of the intersections for defining an uncorrugated region near the intersections. Some of the corrugations on opposite sides of the body being deep enough to be connected to corresponding corrugations on the other opposite side of the body.

16 Claims, 3 Drawing Figures

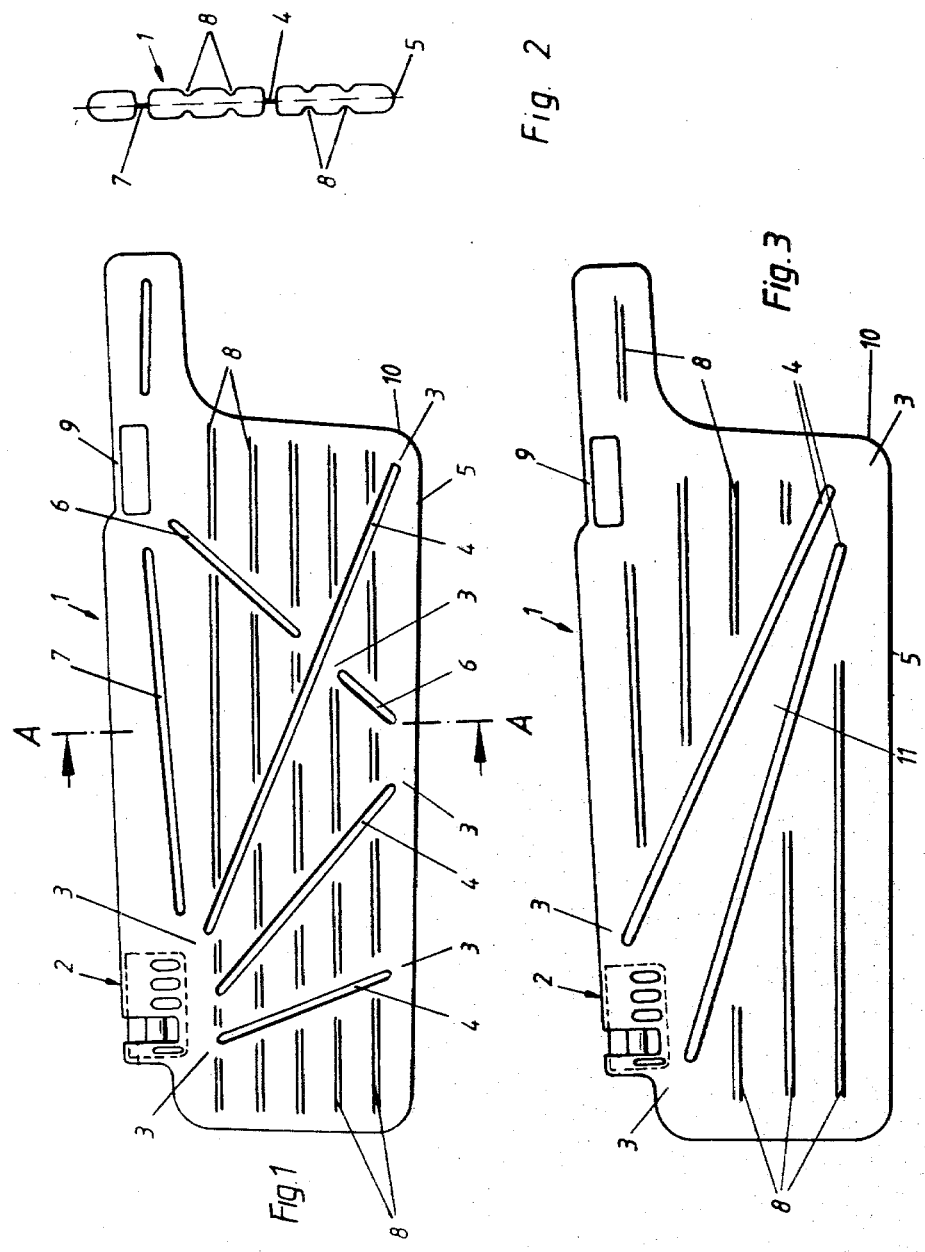

SUN VISOR FOR VEHICLES

BACKGROUND OF THE INVENTION

The present invention relates to a sun visor for motor vehicles, or the like. The sun visor has a visor body, or a reinforcing insert that is inserted in a flexible, protective covering, that is developed as a substantially rectangular blow-molded body. The body has depressed corrugations extending across the opposite sides of the body and over the interior regions of the insert between the edge regions. The corrugations on one side of the insert are at least in part welded to the corrugations on the opposite side of the body.

Such a sun visor is described in German Unexamined Application for Patent DT-OS No. 14 30 197. The blow molding used there for the sun visor has a mirror which is clipped into a cutout. It also has corrugations on both sides extending in the blow molding itself parallel to the longitudinal direction of the mirror. A surrounding corrugation is also welded in the edge region of the mirror. Such blow moldings used for sun visors provide protection against injuries from impact since they are developed with full or substantially full surface. Full-surfaced bodies are relatively unstable, since the have merely a cushion-shaped construction. The corrugations provided in known sun visors can only partially compensate for this lack of stability since only in the region of the clip-in mirror can a surface of increased stability be obtained by the welded together surrounds corrugations of the two surfaces on opposite sides of the visor body. The resulting reinforcement, however, cannot assure sufficient stability in the case of sun visors which are fastened at one side thereof to a mount in the vehicle. Furthermore, the strength of a blow molding produced from themorplastic resin decreases greatly with an increase in the temperature to which the molding is exposed, which frequently occurs in a car during warm weather. In particular, during the summer, even in the middle latitudes, temperatures inside vehicles in direct sunlight of far above 50° C. may occur. The plastic material of the blow molding softens, even if not completely. But, in any event, it loses its flexural strength. Despite various reinforcements of the blow moldings, this had led to permanent deformations of sun visors. In particular, sun visors having a single swivel mount sink at one end and sun visors having two mounts, such as swing mounts, sag in the center. This occurs particularly if the body of the sun visor additionally supports a load such as a make-up mirror, parking tag or receiving pockets for utensils such as eyeglasses, or the like. The permanent deformation of the visor takes place both when the sun visor is swung up and when it is swung down. In both caases, it is equally unpleasant, since it leads to unattractive sun visors with impaired function.

In automobile sun visors, the use of a reinforcing insert made by injection molding and developed as a lattice-work has already been attemped in order to remedy the above noted drawback. See, for instance, U.S. Pat. No. 4,163,579, assigned to the assignee hereof. In this case, the struts arranged in the lattice-work of the reinforcing insert are developed as tension struts and, starting from the mount, they move apart radially from each other toward the lower edge of the visor and toward the lateral frame region of the reinforcing insert, which is located away from the visor mount. Such lattice-work like reinforcing inserts, however, require a relatively thick cover padding of foam in order to satisfy safety regulations. In order not to exceed a predetermined thickness of the sun visor, the reinforcing inserts must be made relatively flat, and they therefore have only slight stability in the transverse direction. Furthermore, a sun visor having such a lattice-work reinforcing insert is of relatively complicated construction and is expensive to manufacture.

SUMMARY OF THE INVENTION

The object of the present invention is to provide a sun visor or sun-visor insert made of a blow molding such that its dimensional stability is retained even upon great force being applied and upon exposure to above-normal heating, both when the visor is swung up and when it is swung down, and wherein the insert provides increased protection against accidents when swung down, due to its full-surfaced development, but which insert is so deformable, even in its upwardly swung condition, that no injuries can occur in case a passenger strikes the lower edge of the sun visor. Furthermore, the sun visor should be simple to manufacture and mount and should permit low cost mass production.

This object is achieved in accordance with the invention by providing at least one depressed corrugation in each of the sides of the blow molded body, which corrugation proceeds in the direction of tensile stressing of the visor, from the visor mount where the corrugation extends approximately in the direction, toward that corner of the blow molding which is diagonally opposite the mount. The corrugation terminates within the surface of the blow molding and inside the transition into the edge region of the visor.

There is a tension-absorbing strut or a plurality of such struts that start from a fixed point on the visor body, namely from the mount, and that extend in the direction of deformation of the visor body. These take up all stresses. A sun-visor body in accordance with the invention can absorb four times the forces which occur in practice because the corrugations are oriented so that deformation of the visor body does not take place, even under stronger stressing and even if a weakening of the stability of the material occurs as a result of its being softened by heat.

In order for the sun visor to be stable in every direction, it is important that the corrugations not be arranged across the entire blow molding but that they terminate before the transition into the edge region of the body. If the corrugations extended all the way to the edges of the blow molding, the visor body would be weakened since the cross-section of the body is greatly reduced at the corrugations. Such a development of the corrugations in the blow-molded body can be compared in its technical effect to a film-hinge which is weakened in the hinge direction. This problem is avoided with the corrugations in accordance with the invention because the edge region of the blow-molded body, which is free of corrugations, acts to stabilize the body in every direction and thus prevents deformation of the blow-molded body both in the upwardly swung and the downwardly swung positions. In the upwardly swung position, the region of the sun visor which is most threatened by sagging is present in the region of the corner that is diagonally opposite the mount.

In a further development of the invention, there are two corrugations that are relatively more widely spaced apart from each other nearer the mount and that gradually extend closer to each other, forming an acute angle, moving toward that corner of the blow molding body which is diagonally opposite the mount. The gradually narrowing or tapering region of the visor body between these corrugations forms a support of constant strength. In the downwardly swung position, the two corrugations thus produce tensile struts which extend in the direction of stressing, while in the upwardly swung position, between the two corrugations, a support is formed which makes it possible to achieve sufficient stability of the visor body under these conditions, even if the rest of the blow molded body is unstable.

In addition to the above described corrugations, other corrugations that start from the region of the mount can extend to the lower edge region and to the lateral edge region of the body, opposite the mount.

In order to increase the deformability of the blow-molding upon impact against its lower edge, additional corrugations, arranged parallel to the lower longitudinal edge of the blow molding and aimed in a direction to intersect the previously mentioned corrugations, are provided. In this case, only the corrugations that extend in the direction of tensile stress are deep enough to contact and are welded to the corresponding corrugations on the opposite side of the insert, while those corrugations extending parallel to the lower longitudinal edge of the visor body are not very deep, so that these corrugations on the opposite sides of the insert do not contact each other. Between the surrounding edge of the blow molding and at all of the longitudinal ends of the corrugations, there is provided a free space at which no depressed corrugations are formed in the sides of the blow molded body. The opposite sides of the body thereby define a surrounding undepressed, uncorrugated hollow edge region of the body, which contributes considerably to the stability of the blow molding, without however impairing the deformability of the blow molding in case of an accident.

Other objects and features of the invention will be apparent from the following description, considered with reference to the two illustrative embodiments shown in the accompanying drawings.

BRIEF DESCRIPTION OF THE DRAWINGS

FIG. 1 is a top view of a blow molding which may be used as an insert for or as the body of a sun visor, FIG. 2 is a section along the line A—A of FIG. 1, and FIG. 3 shows a second embodiment of the insert for or body of a sun visor and having a different arrangement of the corrugations.

DESCRIPTION OF THE PREFERRED EMBODIMENTS

A blow molded body 1 of substantially rectangular shape is shown in FIG. 1. It has an upper and a lower edge and opposite lateral or side edges. The body 1 can be formed by the blow molding process from a tube or else from two sheets. The completed molded body has two opposite sides which are generally mirror images of one another. The body 1 is provided in its upper corner region, to the left in the direction of view in FIG. 1, with a visor mount 2 which, in known manner, is an integral development of the blow molding 1.

Starting from the mount 2 at the upper edge, and arranged generally radially around the mount, there are three corresponding depressed corrugations 4 defined in each of the opposite sides of the body 1. These corrugations extend in the direction toward the corner 10 of the blow molding 1, which corner is diagonally opposite the mount 2 at the lower edge of the body. The corrugations also extend in the direction toward the lower edge 5 of the molding 1. Both in the region of the mount 2 and in the region of the lower edge 5 and the corner 10 of the body, the corrugations 4 each terminate at each end thereof to maintain a respective undepressed free space 3 at and just beyond each end, in such a manner that the corrugations cannot cause any weakening of the blow molding 1 in the direction transverse to the corrugations 4. The corrugations 4 stabilize the blow molding 1, particularly as to tension in the direction of their course, and they take up a load, which is applied from the regions of the blow molding 1 which are generally opposite the mount 2.

An additional reinforcement transverse to the corrugations 4 is achieved by another transverse corrugation 6, also defined in each of the opposite sides of the body 1. The transverse corrugation 6 terminates in the upper edge region of the blow molded body 1 in the vicinity of an outer support 9, which support is developed as a detachable mount for permitting a swinging of the sun visor from the windshield toward a side window. It extends obliquely down toward the bottom edge of the body closer to the lateral edge at which the mount 2 is located. The direction of the corrugation 6 causes it to intersect a corrugation 4. But to avoid actual intersection, the corrugation 6 is interrupted at the corrugation 4. In this case, therefore, there are undepressed free spaces between the corrugations 4 and the transverse corrugation 6 and between the ends of each of the corrugations and the edge regions of the blow molded body 1, respectively.

Another corrugation 7, also defined in each of the opposite sides of the body 1, extends from the mount 2 generally laterally in the direction toward the opposite support 9.

As can be seen from FIG. 2, the corrugations 4, 6 (not shown) and 7 are relatively wide and deeply embossed and each of these corrugations on each side of the body 1 meets the corresponding mirror image corrugation on the other side of the body 1. The rear or meeting sides of the corrugations at opposite sides of the body 1 are connected in a suitable manner, e.g. by welding. This welding considerably increases the stability of the blow molded body since mutual displacement of the opposite surfaces of the body is thereby prevented.

Shallow corrugations 8 are provided on the opposite sides of the body 1. They are substantially parallel to each other and to the lower edge 5 of the body 1. They serve to stabilize the surface of the blow molding against bending in the longitudinal direction, but the also permit an accordion-like or bellows-like displacement of the blow molding 1 upon an impact against the lower edge 5. The corrugations 8 are less deep than the corrugations 4, 6 and 7 and therefore there is no contact between the rear surfaces of the corresponding corrugations 8 on the opposite sides of the blow molding 1. The corrugations 8 extend in a direction that would intersect the corrugations 4, 6 and 7. At such intersections, however, the corrugations would weaken the visor body. Therefore, where such intersections might occur, the corrugations 8 are interrupted. In all cases, therefore, and particularly due to the interruptions in the corrugations 6 and 8, there are free spaces 3 between the corrugations.

The blow molding 1 shown in FIG. 1 is protected by the corrugations 4 against deformations in the downwardly swung position of the visor. But because this is a large surface blow molding, the corrugations 4 cannot completely prevent the corner 10 opposite the mount 2 from sinking somewhat upon exposure of the visor to strong heating. In order to remedy this, another arrangement of the corrugations 4 is possible. In the embodiment shown in FIG. 3, two corrugations 4 extend from the vicinity of the mount 2, where the corrugations are wider apart, and are gradually directed toward each other, at an acute angle, moving toward the region of the diagonally opposite corner 10 of the body 1. The corrugations 4 are as deeply embossed as in the embodiment of FIG. 1, so that the corrugations on one side of the molded body 1 can be welded to the corresponding corrugations on the other side of the body 1. As a result of the angled paths of the corrugations 4, a region is defined between the corrugations 4 which forms a support 11 of constant strength for stresses occurring in the transverse direction, while the sun visor is in the upwardly swung position. As is known, this support development permits the avoidance of irregularities of stress in the support. As a result of the uniform stressing and utilization of material, it is possible to obtain less sagging of the body 1. The sun visor shown in FIG. 3 thus has increased stability in the upwardly swung position, as compared with the sun visor shown in FIG. 1, while there stability is equivalent in the downwardly swung position. The corrugations 8, which are again parallel to the lower edge 5 of the body 1, are substantially the same as those shown in FIG. 1. They are again interrupted where they would intersect the corrugations 4, defining the free spaces at the ends of the corrugations 8 adjacent the corrugations 4. However, in the region of the support 11 of constant strength, none of the parallel corrugations 8 are provided since they would reduce the moment of flexural resistance of the support 11. Furthermore, between the ends of the corrugations 4 and 8 and the surrounding edge portion of the blow molded body 1, the free undepressed spaces 3 provide additional stability for the blow molded body 1 in all directions.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. In a sun visor for an automotive vehicle, or the like, a generally rectangularly shaped blow molded body defined by two opposite, spaced apart sides which are held together; the body having an upper and a lower edge and two lateral side edges, the body being surrounded by edge regions defined at the respective edges; the body having corner regions; the body having an open internal space extending from the edges through the edge regions and being substantially continuous across said body;
   the body having a mount therefor arranged in at least one of the corner regions thereof at the upper edge thereof;
   a plurality of depressed corrugations formed in each of the opposite sides of the body and the corrugations extending across the interior regions of the body between the edge regions thereof;
   at least a first one of the corrugations extending in that direction of tensile stress of the body that extends generally from the mount toward the corner region which is diagonally opposite the mount; and
   the corrugations having respective ends that terminate in the body, before extending into the edge regions of the body, whereby the corrugations do not extend into the edge regions of the body.

2. The sun visor of claim 1, wherein at least two of the corrugations extend in that direction of tensile stress of the body that extends generally from the mount toward the corner region which lies diagonally opposite the mount; the two corrugations being spaced further apart from each other nearer the mount and being angled at an acute angle with respect to each other, and being gradually closer together as they extend toward the opposite corner region of the body from the mount.

3. The sun visor of claim 2, wherein the two corrugations are so placed and angled as to define a region of generally constant strength between the two corrugations.

4. The sun visor of claim 2, further comprising additional ones of the corrugations extending across the body parallel to the lower edge of the body; the additional corrugations extending in a direction in which they would intersect the first mentioned corrugations, but the additional corrugations having ends thereof which are so placed as to avoid intersecting the first mentioned corrugations and as to leave an uncorrugated space between the ends of the additional corrugations and the first mentioned corrugations.

5. The sun visor of claim 4, wherein the additional corrugations are not formed in the region between the two first mentioned corrugations.

6. The sun visor of claim 1, wherein there are a plurality of the corrugations that extend from the region of the mount toward the opposite edge region of the body at the lower edge of the body, and that also extend towad the edge region of the body that is at the side of the body away from the side thereof having the corner region near which the mount is located.

7. The sun visor of claim 6, further comprising additional ones of the corrugations extending across the body parallel to the lower edge of the body; the additional corrugations having ends thereof which are so placed as to avoid intersecting the other corrugations and as to leave an uncorrugated space between the ends of the additional corrugations and the after corrugations.

8. The sun visor of either of claims 6 or 7, further comprising a further one of the corrugations which extends generally from the corner region at the upper edge and at the lateral side of the body away from the mount toward the lower edge of the body and toward the lateral side edge of the body near the mount, whereby the further one of the corrugations is inclined.

9. The sun visor of claim 8, wherein one of the first mentioned corrugations and the further corrugation are so positioned on the body and extend in respective directions in which they would intersect, and one of the corrugations which would intersect being interrupted in the vicinity of the intersection of the corrugations for defining an uncorrugated space at both sides of the non-interrupted corrugation thereby for strengthening the body in the vicinity of the intersection of the corrugations.

10. The sun visor of any of claims 1, 2 or 6, wherein at least one of the corrugations on one opposite side of the body is deep enough to communicate with and be connected to and is so placed for being connected to and is connected to a correspondingly positioned one of the corrugations on the other opposite side of the body.

11. The sun visor of claim 10, wherein the corrugations that extend in the direction of tensile stress of the body are the corrugations that are connected to correspondingly positioned corrugations on the other opposite side of the body.

12. The sun visor of claim 11, further comprising additional ones of the corrugations extending across the body parallel to the lower edge of the body; the additional corrugations having ends thereof which are so placed as to avoid intersecting the other corrugations and as to leave an uncorrugated space between the ends of the additional corrugations and the other corrugations.

13. In a sun visor for an automotive vehicle, or the like, a generally rectangularly shaped blow molded body defned by two opposite sides which are held together; the body having an upper and a lower edge and two lateral side edges; the body being surrounded by edge regions defined at the respective edges; the body having corner regions;

the body having a mount therefor arranged in at least one of the corner regions thereof at the upper edge thereof;

a plurality of depressed corrugations formed in each of the opposite sides of the body and the corrugations extending across the interior regions of the body between the edge regions thereof;

at least two of the corrugations extending in that direction of tensile stress of the body that extends generally from the mount toward the corner region which lies diagonally opposite the mount; the two corrugations being spaced further apart from each other nearer the mount and being gradually closer together as they extend toward the opposite corner region of the body from the mount;

the two corrugations being so placed and angled as to define a region of generally constant strength between the two corrugations;

additional ones of the corrugations extending across the body parallel to the lower edge of the body; the additional corrugations extending in a direction in which they would intersect the first mentioned corrugations, but the additional corrugations having ends thereof which are so placed as to avoid intersecting the first mentioned two corrugations and as to leave an uncorrugated space between the ends of the additional corrugations and the first mentioned two corrugations; the additional corrugations not being formed in the region between the two first mentioned corrugations; and the corrugations having respective ends that terminate in the body, before extending into the edge regions of the body, whereby the corrugations do not extend into the edge regions of the body.

14. In a sun visor for an automotive vehicle, or the like, a generally rectangularly shaped blow molded body defined by two opposite sides which are held together; the body having an upper and a lower edge and two lateral side edges; the body being surrounded by edge regions defined at the respective edges; the body having corner regions;

the body having a mount therefor arranged in at least one of the corner regions thereof at the upper edge thereof;

a plurality of depressed corrugations formed in each of the opposite sides of the body and the corrugations extending across the interior regions of the body between the edge regions thereof;

at least two of the corrugations extending in that direction of tensile stress of the body that extends generally from the mount toward the corner region which lies diagonally opposite the mount; the two corrugations being spaced further apart from each other nearer the mount and being gradually closer together as they extend toward the opposite corner region of the body from the mount;

the two corrugations being so placed and angled as to define a region of generally constant strength between the two corrugations;

additional ones of the corrugations extending across the body parallel to the lower edge of the body; the additional corrugations extending in a direction in which they would intersect the first mentioned corrugations, but the additional corrugations having ends thereof which are so placed as to avoid intersecting the first mentioned two corrugations and as to leave an uncorrugated space between the ends of the additional corrugations and the first mentioned two corrugations; and the corrugations having respective ends that terminate in the body, before extending into the edge regions of the body, whereby the corrugations do not extend into the edge regions of the body.

15. The sun visor of claim 13 or claim 14, in which each one of the additional ones of the corrugations extends from one of the edge regions to the other of the edge regions along a straight line but is interrupted in the vicinity of the at least two corrugations extending generally from the mount to the diagonally opposite corner region, to avoid intersection of these corrugations.

16. The sun visor of claim 12, in which each one of the additional ones of the corrugations extends from one of the edge regions to the other of the edge regions along a straight line but is interrupted in the vicinity of the at least two corrugations extending generally from the mount to the diagonally opposite corner region, to avoid intersection of these corrugations.

* * * * *